Patented June 20, 1939

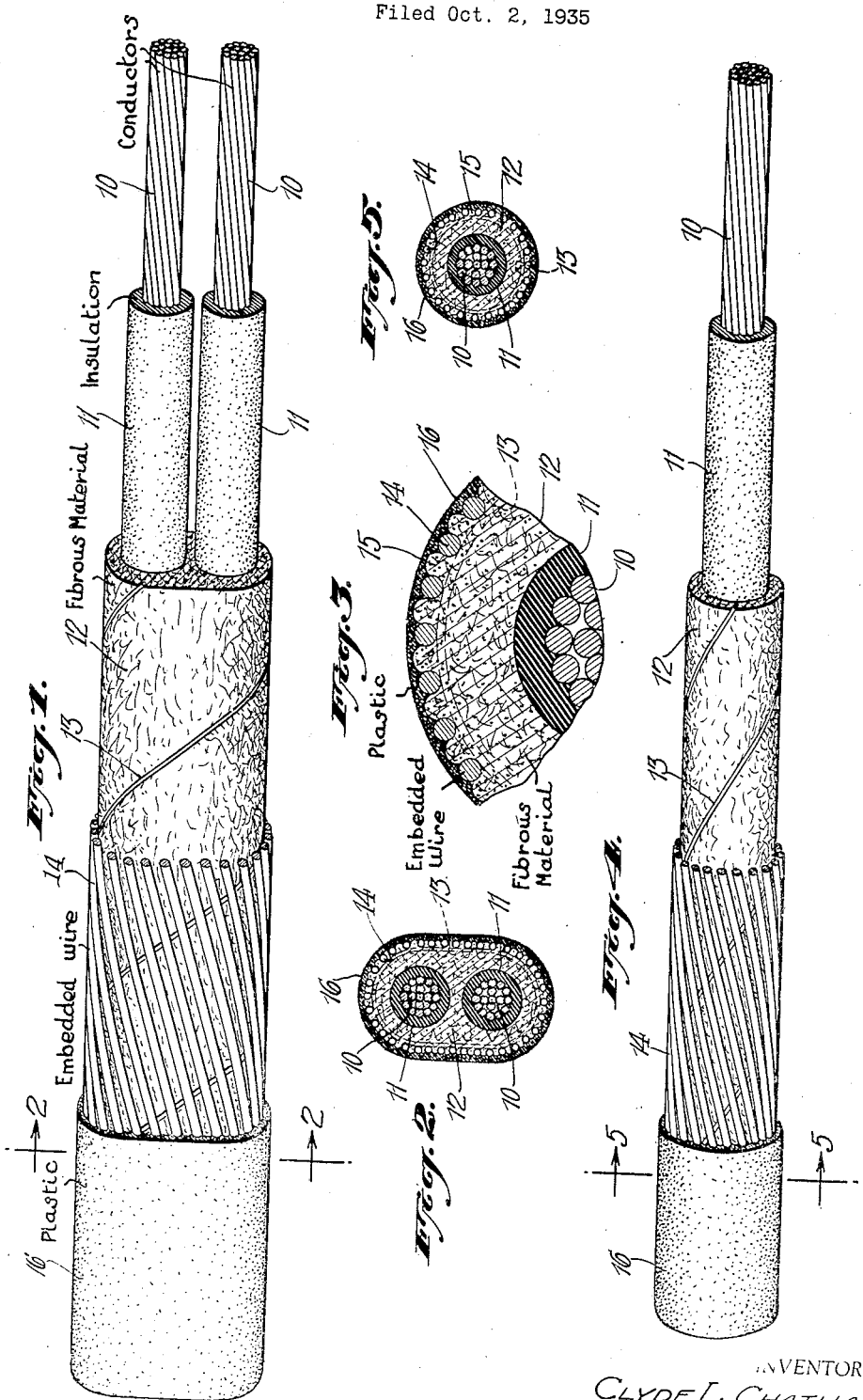

2,163,235

UNITED STATES PATENT OFFICE 2,163,235

ELECTRIC CABLE

Clyde L. Chatham, Nutley, N. J.

Application October 2, 1935, Serial No. 43,226

4 Claims. (Cl. 174—107)

My invention relates to concentric conductor cables having one or more inner conductors surrounded by and insulated from an outer neutral conductor.

Heretofore cables of this type, such as those used for service entrance and drop cables, have been constructed with a central conductor having a rubber insulation covered with a braided jacket. One or more of these insulated conductors are then wrapped or enclosed in a layer of fine wires which form the neutral or return or grounded conductor of the circuit. The neutral wires are then covered and protected by one or more fabric tapes and an outer braid. In some cases a layer of metallic armor is placed about the neutral conductor wires. Inasmuch as the neutral wires are at ground potential the covering of braid is not for the purpose of insulation but to hold the wires in place and to retain a preservative asphaltic compound with which the braid is impregnated. If the outer protective braid is omitted, it is necessary to use heavy wires for the neutral conductor in order to ensure against injury. Moreover, such a cable having its neutral wires exposed is more easily tampered with than one in which the neutral wires are covered.

In my present invention I provide an improved cable of the above general type in which the construction is much simplified, lighter and easier to install, while still preserving the tamper-proof characteristics and the appearance of a cable having the neutral wires covered and protected by a braided covering.

In my invention I provide a fibrous enclosure or covering about the inner conductor or conductors which are insulated as, for example, by the usual rubber insulation. This fibrous enclosure may be of any suitable fibrous material, a cellulose fiber such as cotton being suitable. The enclosing fibrous layer is sufficiently fluffy to permit a wire to embed itself therein and, during manufacture, may be loosely held in position by a binder thread wrapped helically about it. An outer layer of closely spaced neutral wires is then wound in a helical direction about the fluffy enclosure with sufficient tightness to partly, or very nearly, embed the wires therein and so that the fluffy fibrous material fills the spaces between adjacent neutral wires of the layer. There is thus formed a cushion or mass of fibrous material between each neutral wire and the adjacent neutral wire to hold the wires in position. The enclosure is then saturated with asphaltic or wax material and the excess of material on the surface of the wires is smoothed to form a coating or covering thereon having the general appearance of a saturated braided jacket. The fibrous mass enclosed by and between the neutral wires not only serves to hold the neutral wires in properly spaced position, but also to anchor the protective asphaltic or waxy coating onto the wires.

The various features of the invention are illustrated by way of example in the accompanying drawing, in which—

Fig. 1 is a longitudinal section of a three-conductor cable embodying the invention, the various layers being successively stripped to identify the underlying layers.

Fig. 2 is a section on line 2—2 of Fig. 1.

Fig. 3 is a portion of the section shown in Fig. 2 on a greatly enlarged scale.

Fig. 4 is a view similar to that of Fig. 1 of a single inner conductor cable, and Fig. 5 is a section on line 5—5 of Fig. 4.

In the specific embodiment of the invention shown in the accompanying drawing, one or more inner conductors 10 individually enclosed in a rubber insulating sheath or sheaths 11 are covered or wrapped with a mass of fibrous material 12. As shown in Fig. 1, the fibrous mass 12 may penetrate between the insulation 11 and embed the conductors individually. During manufacture or assembly the fibrous layers 12 are temporarily held in position by helical binder threads 13. A layer of spaced neutral conductor wires 14 is then wrapped about the fibrous mass 12 in a helix so that these wires extend in a generally longitudinal direction. They are embedded partially, or almost completely, in the fibrous mass 12 as shown more fully in Fig. 3. Each of the wires 14 is thereby separated from the next adjacent wire on each side by ridges 15 of fluffy material left between the embedded wires 14. In the preferred embodiment the entire structure is then saturated and impregnated with a suitable asphaltic compound. The excess of compound on the surface is then smoothed down to form a smooth finish. Other coatings of surfacing material may be added and the resulting finish may be dusted with mica to form a final outer coating 16.

Through the above invention I have provided a cable in which there is a simple, light and effective mounting of the neutral wires of a concentric cable. The resulting cable is easy to install as it does not require the removal of braid, and it presents a very smooth pleasing appearance. The wires of the neutral conductor are effectively anchored in place and the construction is such that access cannot be readily obtained to the inner conductors for theft of current without danger of short circuiting.

What I claim is:

1. An electric service entrance cable which comprises an insulated conductor, a layer of fluffy resilient fibrous material enclosing said insulated conductor, wires wrapped helically about and embedded in separated open spiral grooves formed by embedding said wires in said fibrous layer, and a plastic material saturating said fibrous material between said spiral grooves and coating and covering the surfaces of said wires facing the openings of said grooves.

2. An electric service entrance cable which comprises a pair of rubber insulated conductors, a layer of fluffy resilient fibrous material enclosing said insulated conductors, a layer of neutral conductor wires wrapped helically about and embedded in separated open spiral grooves formed by embedding said wires in said fibrous material, and a plastic material saturating said fibrous material between said spiral grooves and coating and covering the surfaces of said wires facing the openings of said grooves.

3. An electric service entrance cable which comprises an insulated conductor, a layer of untwisted fluffy resilient fibrous material enclosing said insulated conductor, wires wrapped helically about and embedded in separated open spiral grooves formed by embedding said wires in said fibrous layer, a plastic material saturating said fibrous material between said spiral grooves and coating and covering the surfaces of said wires facing the openings of said grooves, and a mica finish on said covering.

4. An electric service entrance cable which comprises an insulated inner conductor, a layer of untwisted fluffy cotton about said insulated conductor, a layer of neutral conductor wires wrapped about and embedded in said cotton layer to provide grooves receiving said wires and ribs of said cotton between each wire of said neutral conductor layer and the adjacent wires thereof, and a plastic composition, coating and covering the surfaces of said wires that face outwardly of said grooves and anchored in the cotton between said wires.

CLYDE L. CHATHAM.